United States Patent
Takahashi

(12) 
(10) Patent No.: US 9,069,165 B2
(45) Date of Patent: Jun. 30, 2015

(54) BINOCULAR IMAGE DISPLAY APPARATUS

(75) Inventor: Koichi Takahashi, Shibuya-ku (JP)

(73) Assignee: OLYMPUS CORPORATION, Tokyo (JP)

(*) Notice: Subject to any disclaimer, the term of this patent is extended or adjusted under 35 U.S.C. 154(b) by 511 days.

(21) Appl. No.: 13/478,687

(22) Filed: May 23, 2012

(65) Prior Publication Data

US 2012/0299923 A1 Nov. 29, 2012

(30) Foreign Application Priority Data

May 24, 2011 (JP) ................................. 2011-116107

(51) Int. Cl.
*G02B 27/01* (2006.01)
*H04N 13/04* (2006.01)

(52) U.S. Cl.
CPC .... *G02B 27/0172* (2013.01); *G02B 2027/0147* (2013.01); *G02B 2027/0132* (2013.01); *H04N 13/044* (2013.01)

(58) Field of Classification Search
CPC .... G02B 23/18; G02B 27/22; G02B 27/2228; G02B 7/06; G02B 7/12; G02B 7/34; G02B 13/00
USPC ......................................................... 345/428
See application file for complete search history.

(56) References Cited

U.S. PATENT DOCUMENTS 6,130,784 A * 10/2000 Takahashi ...................... 359/630
6,246,382 B1 * 6/2001 Maguire, Jr. ...................... 345/8

FOREIGN PATENT DOCUMENTS

JP 06-038246 2/1994

* cited by examiner

*Primary Examiner* — Mark Zimmerman
*Assistant Examiner* — Sarah Le
(74) *Attorney, Agent, or Firm* — Kenyon & Kenyon LLP

(57) ABSTRACT

The invention provides a binocular image display apparatus provided which comprises:
  two image display devices corresponding to the left and right eyeballs of a viewer, respectively, and
  two viewing optical systems, one for the left eye and one for the right eye, for projecting original images on the image display devices onto the left and right eyeballs of the viewer. In the left-eye and right-eye viewing optical systems, an observation image projected onto one eyeball includes a fused image area wherein the observation image overlaps a part of an observation image projected onto another eyeball and a monocular area other than the fused image area, and inside resolution in a horizontal direction with respect to a visual axis of the viewer is set higher than outside resolution.

3 Claims, 9 Drawing Sheets

BINOCULAR IMAGE DISPLAY APPARATUS

CROSS REFERENCE TO RELATED APPLICATIONS

This application claims foreign priority benefits under 35 U.S.C. §119 of Japanese Patent Application No. 2011-116107, filed on May 24, 2011, the contents of which are incorporated herein by reference.

BACKGROUND OF THE INVENTION AND RELATED ART STATEMENT

The present invention relates generally to a binocular image display apparatus comprising an image display device and a viewing optical system for each of the viewer's both eyes.

So far, there has been a head-mounted image display apparatus known in which small-format image display devices are used to enlarge or magnify original images on those display devices by viewing optical systems for presentation to the viewer. For such a head-mounted image display apparatus, there are overall size and weight reductions demanded because it is mounted on the head for use. To make effects of the images presented more realistic, there is still mounting demand for an optical system capable not only of presenting original images on the display device at as wide an angle of field as possible but also of expressing them with high resolution. For the means for meeting such a demand, proposal has now been made of design for causing images on the left and right image display devices to overlap partly so that the resultant fused image can be stereoscopically viewed.

JP(A) 6-38246 discloses a visual image apparatus comprising a left-eye image display device and a right-eye image display device and eyepiece optical systems for guiding images formed by said image display devices to the left and right eyes of the viewer, respectively, wherein of designs of shifting an image displayed by said left-eye image display device left with respect to an image displayed by said right-eye image display device, and shifting an image displayed by said right-eye image display device right with respect to an image displayed by said left-eye image display device, at least one design is used so that virtual images of images formed by said binocular or left- and right-eye image display devices and projected in midair by said eyepiece optical systems overlap at least partly for stereoscopic viewing of said images.

SUMMARY OF THE INVENTION

According to one aspect of the invention, there is a binocular image display apparatus provided which comprises:

two image display devices corresponding to the left and right eyeballs of a viewer, respectively, and two viewing optical systems, one for the left eye and one for the right eye, for projecting original images on the image display devices onto the left and right eyeballs of the viewer, wherein:

in the left-eye and right-eye viewing optical systems, an observation image projected onto one eyeball includes a fused image area wherein the observation image overlaps a part of an observation image projected onto another eyeball and a monocular area other than the fused image area, and inside resolution in a horizontal direction with respect to a visual axis of the viewer is set higher than outside resolution.

The viewing optical systems set up as recited above ensure that in a range of interest of the fused image area where the same image is to be viewed or distinctive images such as parallactic images are to be viewed by both eyes, there is a smaller difference in the optical capability between the viewing systems for a left-eye observation image and a right-eye observation image; in particular, there is a smaller difference in the resolution between the observation images at the horizontal ends of the fused image area where the optical systems are apt to have a performance difference. This would help the viewer to fuse images together, easing burdens on the viewer's body. Images in the monocular area for the left-eye and right-eye provide outer peripheral images less attractive to the viewer's interest in the observation images; it is less disturbing in actual viewing, even when there is more or less of low resolution.

Some of the display screens of the viewing optical systems defines the fused image area with the rest defining the monocular area; so the image viewed and perceived by both eyes of the viewer could be recognized at a viewing angle of field that is effectively wider than a monocular horizontal angle of field, because it becomes the sum of the fused image area and the left-and-right monocular area.

The principles of the invention will now be explained in greater details.

FIGS. 1, 2 and 3 are illustrative in schematic of a conventional binocular image display apparatus. In each figure, the suffixes a and b attached to each reference numeral indicate that the parts are used for the right eye and the left eye, respectively. Located in front of the right eyeball $2a$ and the left eyeball $2b$ of a viewer 1 are a right-eye image display device $5a$ and a right-eye viewing optical system $3a$ as well as a left-eye image displace device $5b$ and a left-eye viewing optical system $3b$.

As depicted in FIG. 1, the right-eye and left-eye image display devices $5a$ and $5b$ are positioned near the rear focal points of the respective viewing optical systems $3a$ and $3b$ located in association with the right eyeball $2a$ and left eyeball $2b$ so that original images displayed on the image display devices $5a$ and $5b$ can be perceived by the viewer in the form of virtual images in which the original images displayed on the image display devices $5a$ and $5b$ are projected and enlarged.

The locations of the viewing optical systems and the original images on the image display devices are set such that, as can be seen from FIG. 4, the image viewed through the binocular image display apparatus is shifted and displayed right with respect to the left eye, and left with respect to the right eye in the horizontal direction.

For one image shifting means, there is a method of displacing the center positions of the image display devices outward with respect to the optical axes of the viewing optical systems $3a$ and $3b$ or displacing the center positions of the original images displayed on the image display device outward within the display screens, as can be seen from FIG. 2.

For other image shifting means, there is a method wherein, as shown in FIG. 3, the optical axes (on-axis chief rays) of the viewing optical systems $3a$ and $3b$ are rotated outwardly with respect to the visual axes $101a$ and $101b$ of the viewer without changing the relation positions of the viewing optical systems and image display devices, and the original images displayed on the image display devices $5a$ and $5b$ are then horizontally displaced by the amount of the aforesaid rotation thereby defining the positions of the original images corresponding to the visual axes $101a$ and $101b$ of the viewer as the image center, defining the inside image as a fused image area, defining the outside image as a fused image area as far as the angle of field corresponding to the inside fused image area, and defining an outside thereof as the monocular viewing area.

When such a viewing screen as depicted in FIG. 4 is formed by use of such means as described above, at the left-side end of the fused image area (A), the horizontal image height for the left-eye viewing optical system is substantially zero, meaning that the center (on-axis) of the optical system is viewed. On the other hand, the horizontal image height for the right-eye optical system means that the inside, outermost position is viewed.

A general optical system has a characteristic feature such that it performs well at the center position yet less with increasing distance. When such a feature is applied to the viewing optical systems of the binocular image display apparatus to view the left-side end of the fused image area, the left-eye viewing optical system defines the best performance position, but the right-eye viewing optical system defines the outermost, worst performance position, rendering the resolving powers of the observation images by both eyes different. With such viewing optical systems, and especially with low resolving powers of the observation images by the left and right eyes, the viewer would have difficulty in fusing images. Alternatively, when the left and right images are 3D images such as parallactic images, there would be difficulty in stereoscopic viewing.

In one aspect of the invention, the right-eye (left-eye) viewing optical system has higher optical performance on the left (right) side so that during the viewing of the left-side (right-side) end of the fused image area, there can be a smaller difference in resolving power between the observation images by both eyes, which makes it easy for the viewer to fuse images or view 3D images.

In one aspect of the invention, the viewing optical systems have different optical performances due to differences in the horizontal direction. For instance, the left-eye viewing optical system may have higher optical performance (the ability to correct aberrations) on the left side and lower optical performance on the right side at the time of design so that at the time of ordinary correction of aberrations, the aberration correction capability on the left side alone can be enhanced, rather than making the aberration correction capability uniform on the left and right sides, thereby boosting up the overall performance.

When such viewing optical systems are applied to the conventional viewing optical systems explained with reference to FIGS. 1, 2 and 3, a visual field image 51*a* that is shifted right is shown on the right-eye 2D image display device 5*a*, and a visual field image 51*b* that is shifted left is shown on the left-eye 2D image display device 5*b*. In the fused image area having higher resolving power, the viewer could view high-resolving-power images through both eyes without feeling fatigue.

With one aspect of the invention, it is thus possible to present a wider screen to the viewer at the binocular angle of field wider than the monocular angle of field. It is also possible to provide a binocular image display apparatus that makes it easier to fuse images in the binocular viewing area with reduced burdens on the viewer.

In another aspect of the invention, the binocular image display apparatus comprises a left-eye viewing optical system and a right-eye viewing optical system, wherein each of the left-eye and right-eye viewing optical systems further comprises a relay optical system for forming an intermediate image for an original image on the image display device, and an eyepiece optical system for projecting that intermediate image as a virtual image.

FIG. 5 illustrates a right-eye arrangement for the binocular image display apparatus. Although the details of that arrangement will be explained later, it is seen that the inventive binocular image display apparatus is made up of viewing optical systems located in front of both eyes of a viewer, wherein each viewing optical system includes, or is made up of, an eyepiece optical system 30 located in front of the eyeball 2 of the viewer (the right eye in this arrangement) and a relay optical system 40 (free-form surface prism) located in the horizontal direction with respect to the viewer and outside of the viewer (on the right-ear side). Each or the viewing optical system will now be explained with reference to FIG. 5.

When the relay optical system is used to form a primary image that is then guided to the eyeball via the eyepiece optical system, it would be equivalent to an arrangement comprising an apparently large display surface attached to the eyepiece optical system should the small display device be largely enlarged at the intermediate image-formation surface, in contrast to an arrangement free of the relay optical system. It is thus possible to achieve a wider viewing angle of field even with the small display device.

For the viewing optical system made up of such a relay optical system and the eyepiece optical system, it is further preferable to satisfy the following requirements or limitations.

In one aspect of the invention, the viewing optical system should preferably satisfy the following condition (1):

$$0.2 \le \theta ru/\theta rl \le 0.9 \quad (1)$$

where, given back ray tracing, θru is an angle of incidence of an inside chief ray on the first reflecting surface in the relay optical system, and θrl is an angle of incidence of an outside chief ray on the first reflecting surface in the relay optical system.

The following discussion will be based on the back ray tracing of light rays leaving the exit pupil (the viewer's eyeball) of the optical system and arriving at the image display surface.

As known generally in the art, the larger the angle of incidence of light on a decentered, powered surface, the more decentration aberrations occurring at that surface, including coma in particular, tend to grow. As the angle of incidence of light on the first reflecting surface after entering the prism that is the relay optical system is small inside and large outside, the decentration aberrations produced at the decentered reflecting surface grow more outside than inside. Thus, satisfying Condition (1) is preferable for boosting up the inside imaging capability.

At less than the lower limit of 0.2, there would be too large a difference in the angle of incidence of an upper and a lower chief ray on the relay optical system with the result that the angle of incidence of lower rays would grow large, producing decentered aberrations in an uncorrectable amount. As the upper limit of 0.9 is exceeded, it would be difficult to make sure a sufficient angle of field.

In one aspect of the invention, it is preferable for the viewing optical system to satisfy the following Condition (2):

$$0.5 \le NAl/NAu \le 0.95 \quad (2)$$

where, given back ray tracing, NAu is an image-side numerical aperture of a light beam inside of the relay system, and NAl is an image-side numerical aperture of a light beam outside of the relay optical system.

Off each point of reflection of light leaving the exit pupil in the eyepiece optical system, inside light rays are reflected at a position near to the pupil; they are going to be reflected at a shorter distance as compared with on-axis light rays. This allows the distance from the primary image to the relay optical system to get relatively longer so that a light beam for the inside screen grows thick at the time of incidence on the relay optical system. To the contrary, light rays for the outside screen are reflected at a position far away from the pupil to form the primary image at a position near to the relay optical system, making a light beam to become thin at the time of incidence on the relay optical system. Accordingly, if the numerical aperture of the outside light beam is less than that of the inside light beam, it would be useful for enhancing the resolving power of the inside light rays.

At less than the lower limit of 0.5, there would be too large a difference in the numerical aperture between the inside and the outside chief ray in the relay optical system, which would render the numerical aperture of outside light rays extremely small, resulting in the inability to obtain sufficient resolving power. As the upper limit of 0.95 is exceeded, the numerical aperture would grow larger outside than inside, rendering it difficult to boost up the inside resolving power.

In one aspect of the invention, it is preferable for the eyepiece optical system to satisfy the following Condition (3):

$$0.1 \leq Dyu/Lm < 0.5 \quad (3)$$

where, given the Y-direction defined by a direction that is orthogonal to the visual axis of the viewer and lies horizontal to the viewer, $Dyu$ is a Y-direction distance from a point of intersection of the visual axis of the viewer with the inside, outermost light ray of the eyepiece optical system, and $Lm$ is a Y-direction distance from a point of intersection of the inside, maximum angle of field of the eyepiece optical system with the outside, outermost light ray.

It is of vital importance that the eyepiece optical system be long in the minus Y-axis direction at the position of the exit pupil of the optical system. At the position of the exit pupil where the on-axis chief ray is positioned near the Y-axis direction center of a concave mirror that is the eyepiece optical system, the on-axis chief ray is reflected toward the viewer's eyeball; that is, it is not possible to reflect and refract light rays obliquely and downward. In turn, this causes the face of the viewer to interfere with the relay optical system, making the location of the relay optical system difficult.

At less than the lower limit of 0.1, the reflective area of the concave surface for inside light rays would get small and, with this, the distance from the exit pupil to the reflecting surface would get short, ending up with interference of the eyepiece optical system with the face of the viewer. As the upper limit of 0.5 is exceeded, it would cause the exit pupil to be positioned below the center position of the eyepiece optical system in the Y-direction system, so the on-axis chief ray goes back to the face of the viewer, resulting in the inability to locate the relay optical system.

In order to reflect lower off-axis light rays obliquely and downward, and form the primary image at a position as near to the eyepiece optical system as possible, it is desirable to make the lower positive power of the eyepiece optical system larger (or stronger). This is because as the primary image position for lower light rays is too far away from the eyepiece optical system, it causes the size of a light beam incident on the relay optical system to get smaller than that of upper light rays, and the effective NA in the relay optical system to become too small, rendering it difficult to obtain sufficient resolving power. It is thus desirable that the intermediate image formed by outside light rays is positioned below the farthest position of the concave mirror in the Y-direction and between the eyepiece optical system and the relay optical system in the Z-direction.

According to the invention, there can be a binocular image display apparatus provided in which when the fused image area—wherein a part of an observation image to be projected onto one of both eyeballs overlaps an observation image projected onto another eyeball—is viewed by both eyes, a difference in the resolution between the presented and enlarged images is kept so small that the viewer can view the fused image area snugly and quite normally.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF THE PREFERRED EMBODIMENTS

Figure 1:
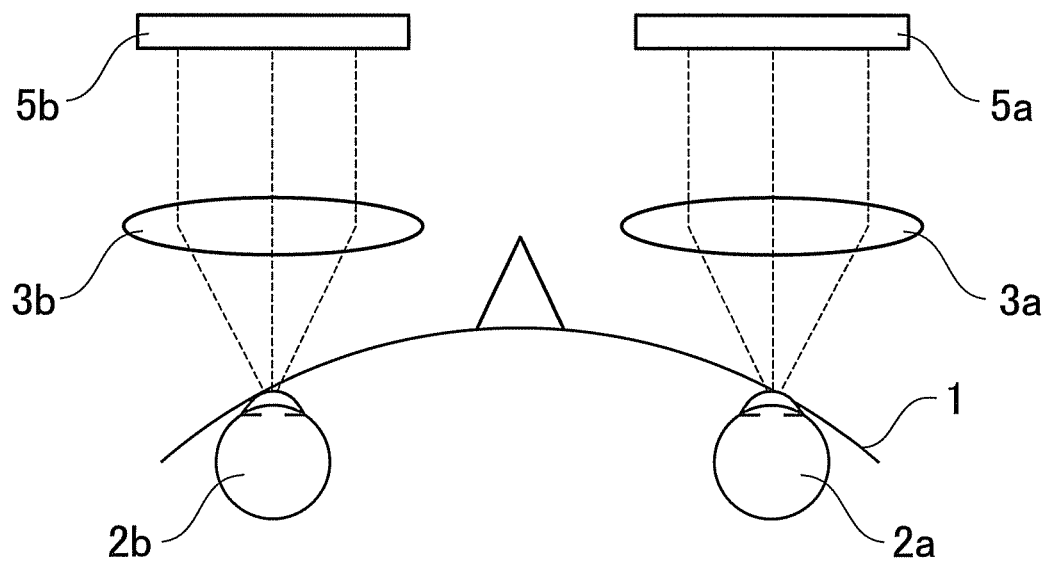
FIG. 1 is illustrative in schematic of the construction of a binocular image display apparatus.
Figure 2:
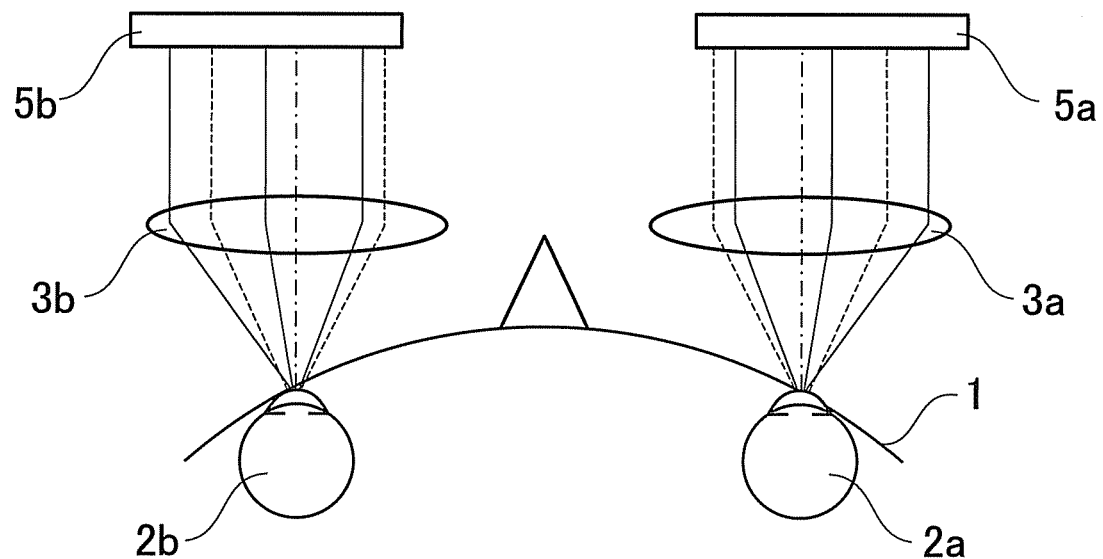
FIG. 2 is illustrative in schematic of one arrangement for shifting images in a binocular image display apparatus.
Figure 3:
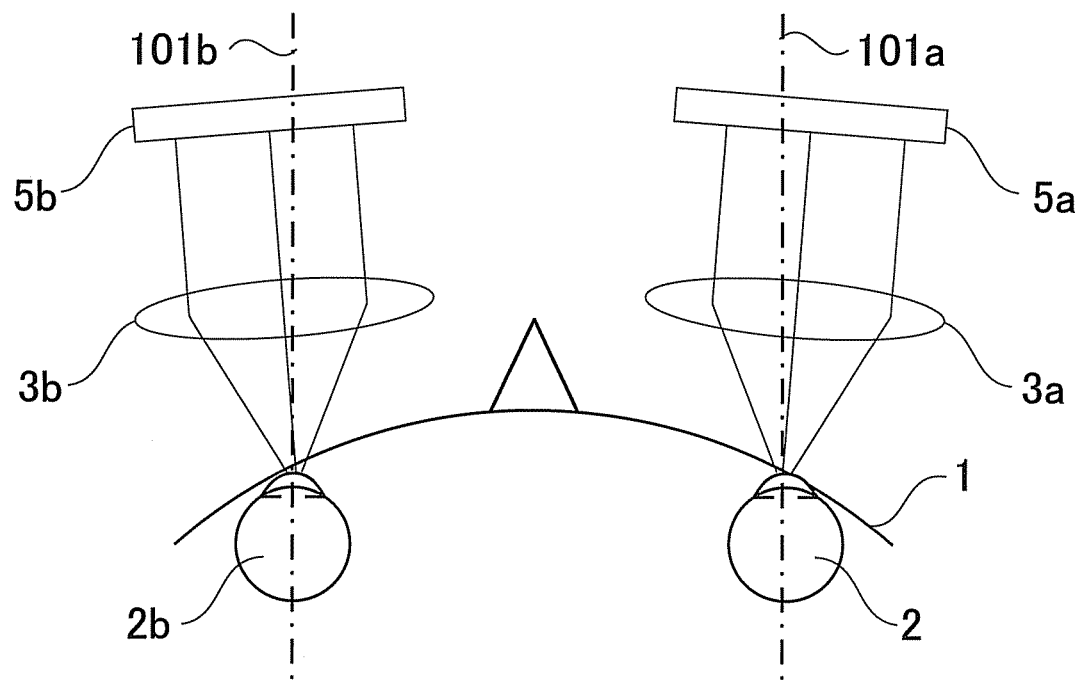
FIG. 3 is illustrative in schematic of another arrangement for shifting images in a binocular image display apparatus.
Figure 4:
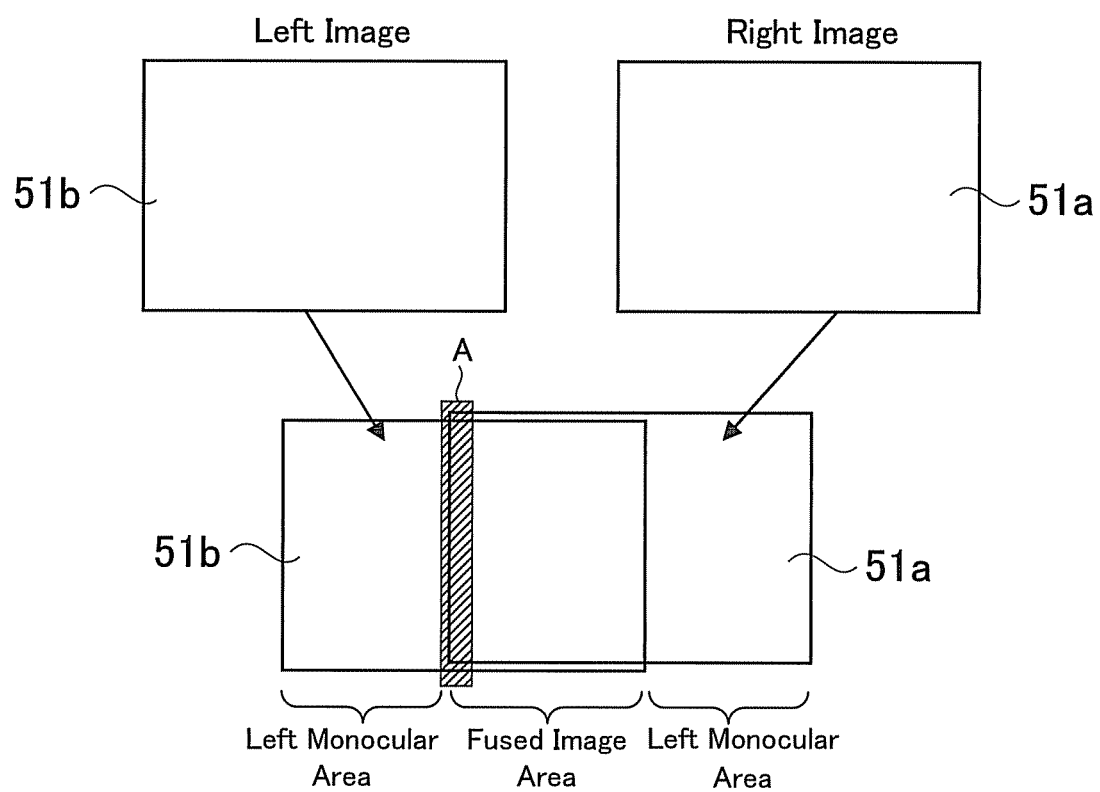
FIG. 4 is illustrative how the image to be viewed by a binocular image display apparatus is formed.
Figure 5:
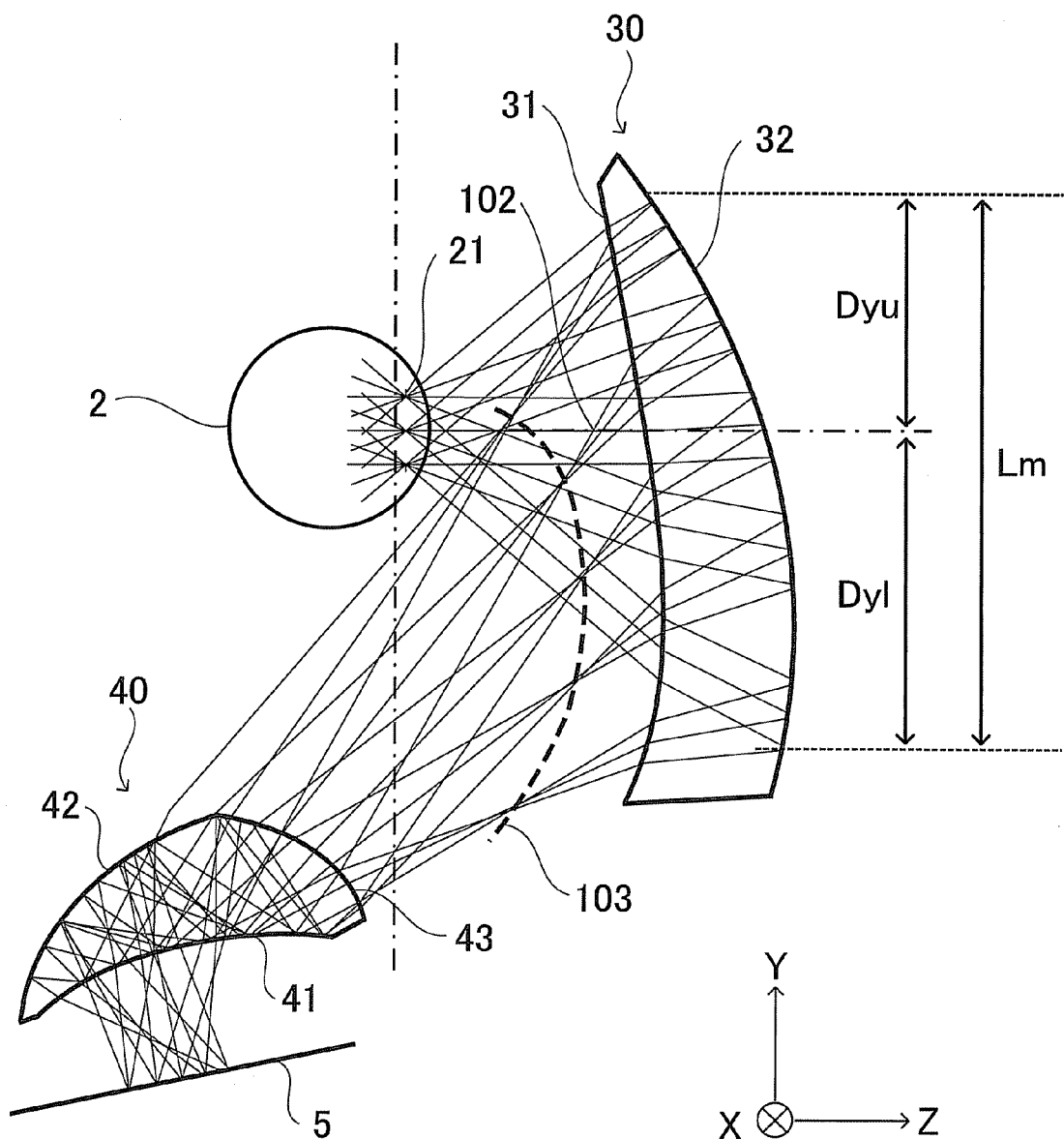
FIG. 5 is illustrative of the binocular image display apparatus (one eye) according to one embodiment (Example 1) of the invention.
Figure 8:
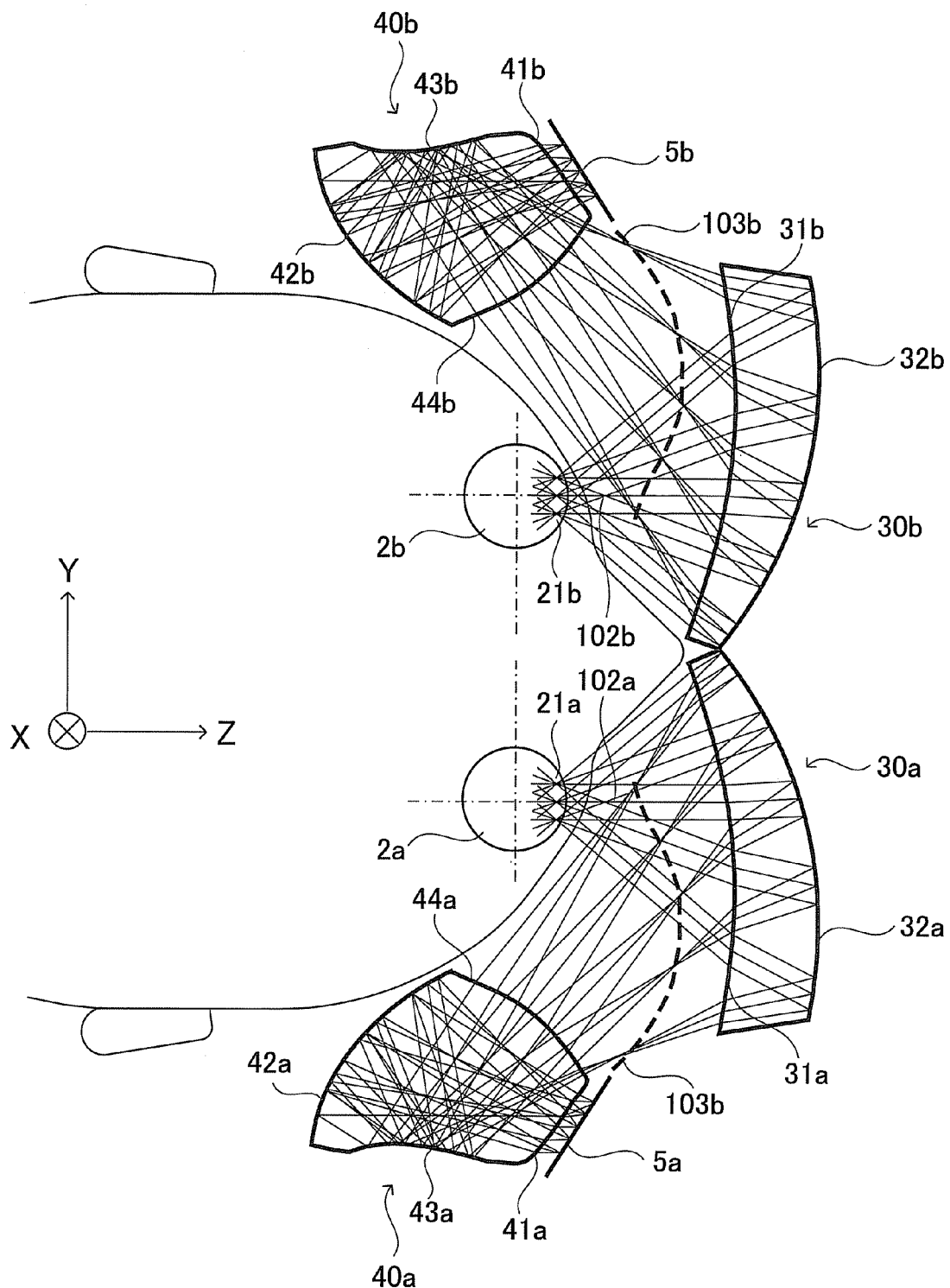
FIG. 8 is illustrative of the binocular image display apparatus (both eyes) according to another embodiment (Example 2) of the invention.

The inventive binocular image display apparatus will now be explained with reference to Examples 1 and 2. Based on back ray tracing, an on-axis chief light ray 102 is defined by a light ray that passes through the center of an exit pupil 21 of an eyepiece optical system and arrives at the center of an image plane (image display device) 5, as shown in FIGS. 5 and 8.

In each example, the Z-axis positive direction is defined by a direction along the direction of travel of the on-axis chief ray (the visual axis of the viewer), the Y-Z plane is defined by a plane including this Z-axis and the center of the image plane, the X-axis positive direction is defined by a direction that passes through the origin, is orthogonal to the Y-Z plane, and goes down through the drawing sheet, and the Y-axis is defined by an axis that forms a right-handed orthogonal coordinate system together with the X-axis and Z-axis.

In each example, each surface is decentered within the Y-Z plane, and only one plane of symmetry of each rotationally asymmetric free-form surface is given by the Y-Z plane. Given to each decentered surface are the amount of decentration of the apex of that surface from the center of the origin of the associated coordinate system (X, Y and Z in the X-, Y- and Z-axis directions) and the angles ($\alpha$, $\beta$, $\gamma$(°)) of tilt of the center axis (the Z-axis of the defining formula (a) given later for the free-form surface) of that surface about the X-axis, the Y-axis, and the Z-axis. It is here noted that the positive $\alpha$ and $\beta$ mean clockwise rotation with respect to the positive directions of the respective axes, and the positive γ means clockwise rotation with respect to the positive direction of the Z-axis.

When a specific surface (inclusive of a virtual surface) of the optical function surfaces forming the optical system of each example and the subsequent surface form together a coaxial optical system, there is a surface separation given. Besides, the refractive indices and Abbe constants of the media are given as usual.

The free-form surface used herein is defined by the following formula (a). Note here that the axis of the free-form surface is given by the Z-axis of that defining formula.

$$Z = cr^2 / \left[1 + \sqrt{1-(1+k)c^2r^2}\right] + \sum_{j=1}^{65} C_j X^m Y^n \quad (a)$$

In formula (a) here, the first term is a spherical term and the second term is a free-form surface term.

In the spherical term,
R is the radius of curvature of the vertex,
k is the conic constant, and
$r = \sqrt{(X^2 + Y^2)}$.
The free-form surface term is $$\sum_{j=2}^{66} C_j X^m Y^n = C1 + C2X + C3Y + C4X^2 + C5XY + C6Y^2 + C7X^3 +$$
$$C8X^2Y + C9XY^2 + C10Y^3 + C11X^4 + C12X^3Y + C13X^2Y^2 +$$
$$C14XY^3 + C15Y^4 + C16X^5 + C17X^4Y + C18X^3Y^2 + C19X^2Y^3 +$$
$$C20XY^4 + C21Y^5 + C22X^6 + C23X^5Y + C24X^4Y^2 + C25X^3Y^3 +$$
$$C26X^2Y^4 + C27XY^5 + C28Y^6 + C29X^7 + C30X^6Y + C31X^5Y^2 +$$
$$C32X^4Y^3 + C33X^3Y^4 + C34X^2Y^5 + C35XY^6 + C36Y^7 \ldots$$

Here $C_j$ (j is an integer of 2 or greater) is a coefficient.

In general, the aforesaid free-form surface has no plane of symmetry at both the X-Z plane and the Y-Z plane. However, by reducing all the odd-numbered degree terms for X down to zero, that free-form surface can have only one plane of symmetry parallel with the Y-Z plane. For instance, this may be achieved by reducing down to zero the coefficients for the terms C2, C5, C7, C9, C12, C14, C16, C18, C20, C23, C25, C27, C29, C31, C33, C35, . . . in the aforesaid defining formula (a).

By reducing all the odd-numbered degree terms for Y down to zero, the free-form surface can have only one plane of symmetry parallel with the X-Z plane. For instance, this may be achieved by reducing down to zero the coefficients for the terms C3, C5, C8, C10, C12, C14, C17, C19, C21, C23, C25, C27, C30, C32, C34, C36, . . . in the aforesaid defining formula.

If any one of the directions of the aforesaid plane of symmetry is used as the plane of symmetry and decentration is implemented in a direction corresponding to that, for instance, the direction of decentraton of the optical system with respect to the plane of symmetry parallel with the Y-Z plane is set in the Y-axis direction and the direction of decentration of the optical system with respect to the plane of symmetry parallel with the X-Z plane is set in the X-axis direction, it is then possible to improve productivity while, at the same time, making effective correction of rotationally asymmetric aberrations occurring from decentration.

As described above, the aforesaid defining formula (a) is shown as one example: the feature of the free-form surface herein is that by use of the rotationally asymmetric surface having only one plane of symmetry, it is possible to correct rotationally asymmetric aberrations occurring from decentration while, at the same time, improving productivity. It goes without saying that the same advantages are achievable even with any other defining formulae.

The aspheric surface used herein is a rotationally symmetric aspheric surface give by the following defining formula (b):

$$Z = (Y^2/R) / [1 + \{1-(1+k)Y^2/R^2\}^{1/2}] + aY^4 + bY^6 + cY^8 + dy^{10} + \quad (b)$$

where Z is an optical axis (on-axis chief ray) provided that the direction of light is taken as positive, Y is the direction vertical to the optical axis, R is a paraxial radius of curvature, k is the conic constant, and a, b, c, d, . . . are the fourth-, sixth-, eighth- and tenth-order aspheric coefficients. The Z-axis in this defining formula provides the axis of the rotationally symmetric surface.

It is here to be noted that the term regarding the free-form surface with no data given is zero. The refractive index is given on a d-line (587.56 nm wavelength) basis, and the length is given in mm.

FIGS. 5 and 8 are Y-Z sectioned views of Examples 1 and 2, each one including an optical axis.

EXAMPLE 1

FIG. 5 illustrates a viewing optical system made up of an image display device 5, an eyepiece optical system 30 and a relay optical system 40 for a one-eye (right-eye) arrangement of the binocular image display apparatus of Example 1.

The relay optical system 40 is a free-form surface prism using plane-of-symmetry free-form surfaces, and comprises three optical surfaces 41, 42 and 43, between which a transparent medium having a refractive index greater than 1 is filled up.

The eyepiece optical system 40 is made up of a back-surface mirror including a concave transmitting surface 31 and a concave reflecting surface 32, between which a transparent medium having a refractive index greater than 1 is filled up.

In terms of back ray tracing, an on-axis chief light ray 102 passing through an exit pupil 1 enters the eyepiece optical system 30 from the concave transmitting surface 31, is then reflected off the concave reflecting surface 32 and again transmits the concave transmitting surface 31, then enters a third surface 43 that is a transmitting surface of the relay optical system 40 (free-form surface prism), is then reflected off a first surface 41 acting as an internal reflecting surface and then reflected off a second surface 42 that is a reflecting surface. The reflected light ray then transmits a first surface 41 of an area having transmitting action, leaving the relay optical system 40 and arriving at a display plane of the image display device 5 located at the position of an image plane for imaging there.

Here, when the angle of incidence of light rays on the first surface 41 is greater than the critical angle, light rays coming out of the third surface 43 are totally reflected at that area. When the angle of incidence of light rays on the first surface 41 is less than the critical angle, that area is coated with an aluminum or other reflection film. It is then essentially necessary that the area coated with the reflection film does not overlap an area from which light is exited out toward the image display device 5.

In Example 1, a curved intermediate surface 102 is formed between the third surface 43 in the relay optical system 40 and the concave transmitting surface 31 of the eyepiece optical system 30.

While Example 1 has been explained in terms of back ray tracing, the fact of the matter is that the display light exited out of the image display device 5 traces back the aforesaid optical path for projection on an enlarged scale into the eyeball of the viewer whose pupil is located at the position of the exit pupil 21. The eyepiece optical system 30 in Example 1 is a curved mirror having two surfaces, each one configured in a rotationally symmetric aspheric surface shape, with a horizontal angle of field of 80°, a vertical angle of field of 61.4° and a pupil diameter of ϕ10.0 mm.

Figure 6:
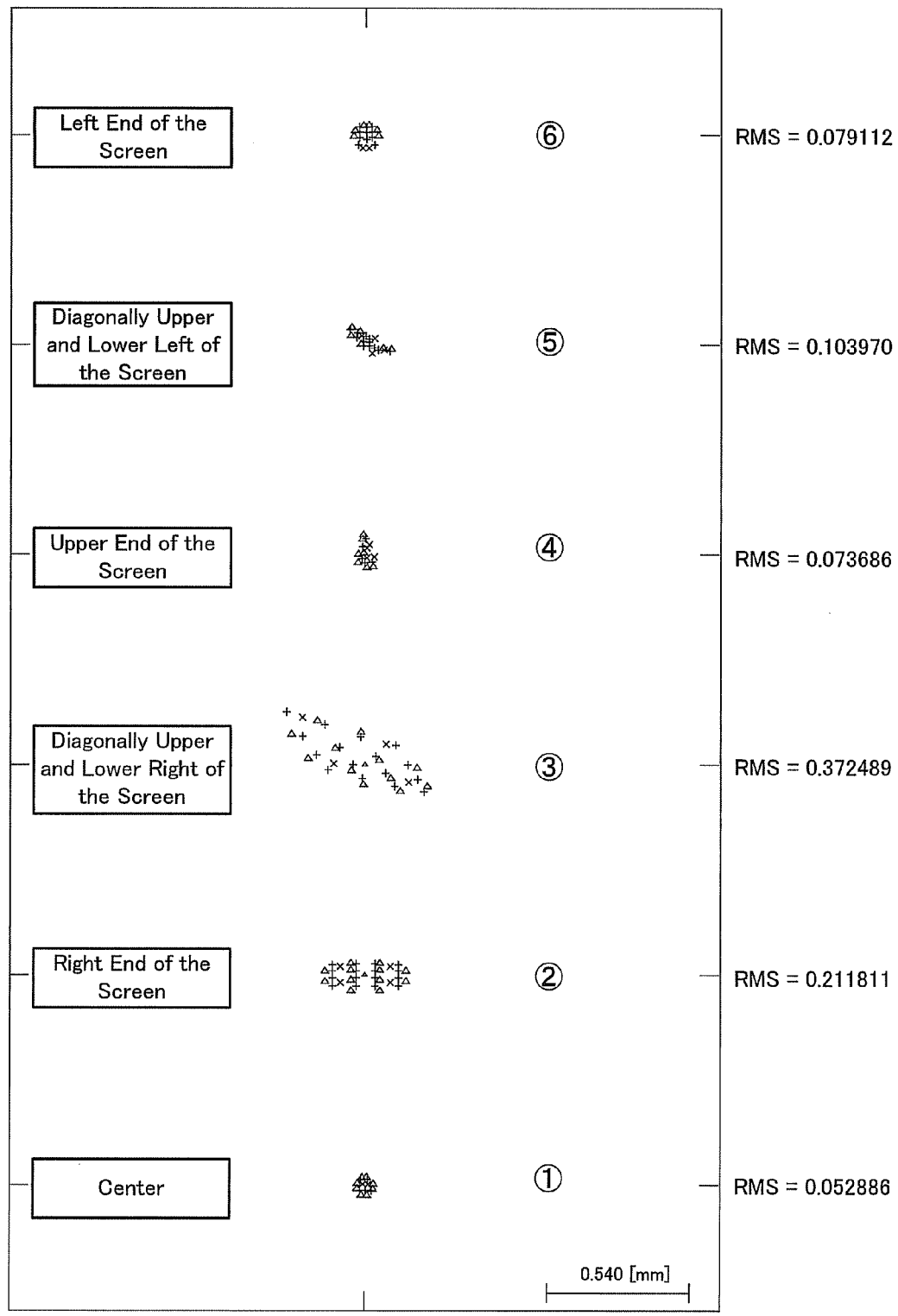
FIG. 6 is a set of spot diagram for one embodiment (Example 1) of the invention.
Figure 7:
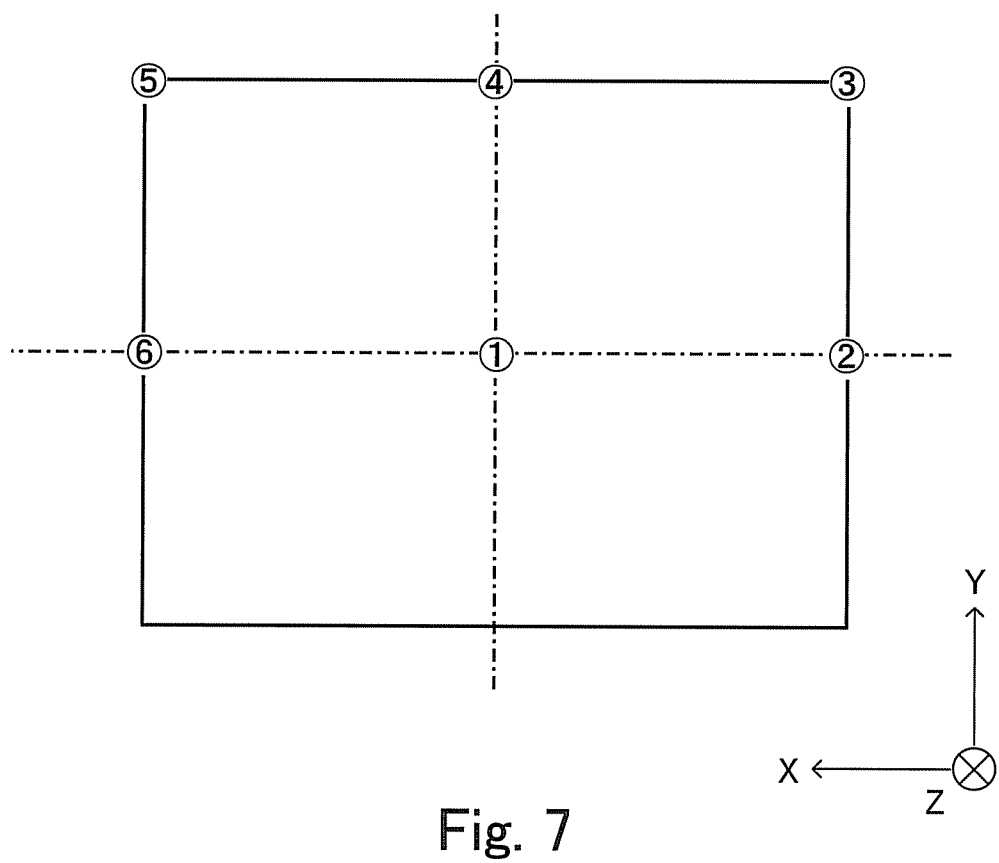
FIG. 7 is illustrative of viewing points in the spot diagrams of FIG. 6.

FIG. 6 is a set of spot diagrams for the viewing optical system made up of the eyepiece optical system 30 and relay optical system in Example 1, and FIG. 7 illustrates viewing points in the spot diagrams of FIG. 6.

This spot diagram is assumed for the right-eye viewing optical system, indicating imaging capability for each viewing point in a viewing screen thereof. Usually, when viewing is implemented using a small-format image display device such as an LCD, the human's pupil diameter is said to be about 4 mm. In the calculation here, too, the exit pupil diameter is supposed to be 4 mm. The center of the screen is indicated by ①, the right side by ②, the upper right by ③, the upper side by ④, the upper left by ⑤, and the left side by ⑥. Shown on the right side of the profile drawing for each spot diagram is the value in mm of RMS (root mean square) that is the quantitative indication of the magnitude of the spot diagram.

As can be seen from FIG. 6, the spot diagrams are smaller on the left side with respect to the center, and larger on the right side. It follows that, in the embodiment here, the imaging capability of the right-eye viewing optical system is more improved in terms of resolving power on the left side that is the inside of the viewing screen than on the right side that is the outside.

EXAMPLE 2

FIG. 8 illustrates the binocular image display apparatus (both eyes) according to Example 1. In FIG. 8, the suffixes a and b attached to each reference numeral indicate that the parts are used for the right eye and the left eye, respectively. The left-eye and right-eye arrangements are similar to each other with the exception that they are symmetrically located, and so such suffixes will be left out in the following explanation.

A relay optical system 40 is a free-form surface prism using plane-of-symmetry free-form surfaces, and comprises optical surfaces 41 to 44, between which a transparent medium having a refractive index greater than 1 is filled up.

An eyepiece optical system 30 is made up of a back-surface mirror including a concave transmitting surface 31 and a concave reflecting surface 32, between which a transparent medium having a refractive index greater than 1 is filled up.

In terms of back ray tracing, an on-axis chief ray 102 passing through an exit pupil 21 enters the eyepiece optical system 30 from the concave transmitting surface 31, is then reflected off the concave reflecting surface 32, again transmits the concave transmitting surface 31, then enters the relay optical system 49 from a fourth surface 44 that is a transmitting surface of the free-form surface prism 40, is then reflected off a third surface 43 that is a reflecting surface, and off a second surface 42 that is a reflecting surface. The reflected light ray is exited out of the relay optical system 40 through a first surface 41 that has only transmission action, finally arriving at a display surface of an image display device 5 located at the position of an image plane for imaging.

In Example 2, a curved intermediate image surface 102 is formed between the fourth surface 44 in the relay optical system 40 and the concave transmitting surface 31 of the eyepiece optical system 30.

While Example 2 has been explained in terms of back ray tracing, the fact of the matter is that the display light exited out of the image display device 5 traces back the aforesaid optical path for projection on an enlarged scale into the eyeball of the viewer whose pupil is located at the position of the exit pupil 21. The concave transmitting surface 32 and concave reflecting surface 32 of the eyepiece optical system 30 in Example 2 are each a curved surface in a free-form surface shape, with a horizontal angle of field of 75°, a vertical angle of field of 60° and a pupil diameter of ϕ12.0 mm.

Numerical examples for the aforesaid Examples 1 and 2 will now be given below, wherein "FFS" is indicative of the free-form surface. Note here that the small letter "e" indicates that the figure subsequent to it is a power exponent having 10 as a base. For instance, "1.0e-5" means "$1.0 \times 10^{-5}$".

EXAMPLE 1

| Surface No. | Radius of Curvature | Surface Separation | Decentration | Refractive Index | Abbe Constant |
|---|---|---|---|---|---|
| Object Plane | ∞ | −1000.00 | | | |
| 1 | ∞ (Dummy Plane) | | | | |
| 2 | ∞ (Stop Surface) | | Decentration (1) | | |
| 3 | Aspheric Surface [1] | | Decentration (2) | 1.5254 | 56.2 |
| 4 | Aspheric Surface [2] | | Decentration (3) | 1.5254 | 56.2 |
| 5 | Aspheric Surface [1] | | Decentration (2) | | |
| 6 | FFS[1] | | Decentration (4) | 1.5254 | 56.2 |
| 7 | FFS[2] | | Decentration (5) | 1.5254 | 56.2 |
| 8 | FFS[3] | | Decentration (6) | 1.5254 | 56.2 |
| 9 | FFS[2] | | Decentration (5) | | |
| Image Plane | ∞ | | Decentration (7) | | |

Aspheric Surface [1]
Radius of Curvature −5085.27

| k | −2.0000e+001 | | | | |
|---|---|---|---|---|---|
| a | −5.8547e−007 | b | 7.5509e−011 | c | −1.3404e−014 |
| d | 6.3895e−019 | | | | |

Aspheric Surface [2]
Radius of Curvature −93.42

| k | −9.9037e−001 | | | | |
|---|---|---|---|---|---|
| a | −6.9085e−008 | b | −1.2934e−011 | c | 1.0193e−015 |

FFS[1]

| C4  | 6.6738e−004  | C6  | −2.9348e−002 | C8  | −1.6156e−003 |
|-----|--------------|-----|--------------|-----|--------------|
| C10 | 5.2387e−004  | C11 | 5.3526e−005  | C13 | 1.4489e−004  |
| C15 | −3.5693e−005 | C17 | −7.2235e−006 | C19 | −7.2233e−006 |
| C21 | 1.3213e−006  | C22 | 5.7673e−008  | C24 | 3.4187e−007  |
| C26 | 1.8076e−007  | C28 | −1.9294e−008 |     |              |

FFS[2]

| C4  | −1.3530e−002 | C6  | −8.0554e−003 | C8  | −5.9789e−005 |
|-----|--------------|-----|--------------|-----|--------------|
| C10 | 1.3591e−004  | C11 | −1.4512e−006 | C13 | 1.0054e−005  |
| C15 | −5.2629e−006 | C17 | −7.6055e−007 | C19 | −6.6668e−007 |
| C21 | 9.3638e−008  | C22 | 2.3561e−008  | C24 | 2.1529e−008  |

-continued

| | | | | | |
|---|---|---|---|---|---|
| C26 | 1.2080e-008 | C28 | -1.8670e-009 | | |

FFS[3]

| | | | | | |
|---|---|---|---|---|---|
| C4 | -1.4268e-002 | C6 | -1.3842e-002 | C8 | -7.3176e-005 |
| C10 | -1.3128e-004 | C11 | -3.4272e-006 | C13 | -5.0372e-006 |
| C15 | -5.1144e-006 | C17 | -7.9111e-008 | C19 | -7.7326e-008 |
| C21 | -8.2669e-008 | C22 | -2.1506e-010 | C24 | -3.1947e-009 |
| C26 | -2.4947e-009 | C28 | -1.2333e-009 | | |

Decentration [1]

| | | | | | |
|---|---|---|---|---|---|
| X | 0.00 | Y | 0.00 | Z | 0.00 |
| α | 0.00 | β | 0.00 | γ | 0.00 |

Decentration [2]

| | | | | | |
|---|---|---|---|---|---|
| X | 0.00 | Y | 17.67 | Z | 32.61 |
| α | 10.83 | β | 0.00 | γ | 0.00 |

Decentration [3]

| | | | | | |
|---|---|---|---|---|---|
| X | 0.00 | Y | -44.02 | Z | 58.26 |
| α | -9.18 | β | 0.00 | γ | 0.00 |

Decentration [4]

| | | | | | |
|---|---|---|---|---|---|
| X | 0.00 | Y | -66.70 | Z | -8.74 |
| α | 36.97 | β | 0.00 | γ | 0.00 |

Decentration [5]

| | | | | | |
|---|---|---|---|---|---|
| X | 0.00 | Y | -74.59 | Z | -19.29 |
| α | 91.77 | β | 0.00 | γ | 0.00 |

Decentration [6]

| | | | | | |
|---|---|---|---|---|---|
| X | 0.00 | Y | -72.89 | Z | -51.44 |
| α | 143.41 | β | 0.00 | γ | 0.00 |

Decentration [7]

| | | | | | |
|---|---|---|---|---|---|
| X | 0.00 | Y | -96.07 | Z | -33.09 |
| α | 101.46 | β | 0.00 | γ | 0.00 |

EXAMPLE 2

| Surface No. | Radius of Curvature | Surface Separation | Decentration | Refractive Index | Abbe Constant |
|---|---|---|---|---|---|
| Object Plane | ∞ | -1000.00 | | | |
| 1 | ∞ (Dummy Plane) | | | | |
| 2 | ∞ (Stop Surface) | | Decentration (1) | | |
| 3 | FFS[1] | | Decentration (2) | 1.5163 | 64.1 |
| 4 | FFS[2] | | Decentration (3) | 1.5163 | 64.1 |
| 5 | FFS[1] | | Decentration (2) | | |
| 6 | FFS[3] | | Decentration (4) | 1.5254 | 56.2 |
| 7 | FFS[4] | | Decentration (5) | 1.5254 | 56.2 |
| 8 | FFS[5] | | Decentration (6) | 1.5254 | 56.2 |
| 9 | FFS[6] | | Decentration (7) | | |
| Image Plane | ∞ | | Decentration (8) | | |

FFS[1]

| | | | | | |
|---|---|---|---|---|---|
| C4 | 2.4051e-003 | C6 | -3.7582e-003 | C8 | -1.1668e-004 |
| C10 | -1.1234e-005 | C11 | -1.9868e-006 | C13 | 4.3143e-007 |
| C15 | 2.6867e-007 | | | | |

FFS[2]

| | | | | | |
|---|---|---|---|---|---|
| C4 | -3.6372e-003 | C6 | -4.1961e-003 | C8 | -2.1570e-005 |
| C10 | -1.3951e-005 | C11 | -1.2177e-007 | C13 | -7.3543e-008 |
| C15 | 5.6758e-008 | C17 | -9.3065e-009 | C19 | 1.0143e-009 |
| C21 | -1.1080e-009 | C22 | -1.3255e-010 | C24 | 5.9511e-011 |
| C26 | -5.6157e-011 | C28 | 4.9171e-013 | | |

FFS[3]

| | | | | | |
|---|---|---|---|---|---|
| C4 | 5.6030e-003 | C6 | 1.7595e-004 | C8 | -1.1440e-004 |
| C10 | 4.1326e-004 | C11 | -2.2085e-005 | C13 | 3.6836e-005 |
| C15 | -9.4143e-007 | C17 | -9.1115e-007 | C19 | 7.8857e-007 |

| | | | | | |
|---|---|---|---|---|---|
| C21 | -2.7796e-007 | C22 | 2.3465e-008 | C24 | 2.2439e-008 |
| C26 | 1.1703e-008 | C28 | -3.5455e-009 | | |

FFS[4]

| | | | | | |
|---|---|---|---|---|---|
| C4 | 3.7183e-003 | C6 | -2.7617e-003 | C8 | -1.5037e-004 |
| C10 | -6.2518e-005 | C11 | 1.0525e-007 | C13 | -1.8507e-006 |
| C15 | -2.7575e-006 | C17 | 4.3074e-009 | C19 | -8.0815e-008 |
| C21 | 1.1020e-008 | C22 | -6.2978e-011 | C24 | -5.5364e-009 |
| C26 | -2.2358e-009 | C28 | -1.5740e-009 | | |

FFS[5]

| | | | | | |
|---|---|---|---|---|---|
| C4 | -6.0590e-003 | C6 | -8.6494e-003 | C8 | -3.7663e-005 |
| C10 | -4.3932e-005 | C11 | -4.0548e-009 | C13 | -8.0788e-007 |
| C15 | -1.2556e-006 | C17 | -1.6284e-008 | C19 | -1.8109e-008 |
| C21 | -2.0809e-008 | C22 | 1.9137e-010 | C24 | 4.2481e-010 |
| C26 | -2.5373e-010 | C28 | -2.9922e-010 | | |

FFS[6]

| | | | | | |
|---|---|---|---|---|---|
| C4 | 4.0211e-002 | C6 | -1.5508e-002 | C8 | -1.3306e-003 |
| C11 | -2.3361e-004 | C13 | -9.6415e-005 | C15 | 3.0810e-004 |
| C17 | 4.7860e-005 | C19 | -5.7460e-007 | C21 | -2.5946e-005 |
| C22 | -1.0991e-006 | C24 | -1.7839e-006 | C26 | 2.6690e-007 |
| C28 | 6.4371e-007 | | | | |

Decentration [1]

| | | | | | |
|---|---|---|---|---|---|
| X | 0.00 | Y | 0.00 | Z | 0.00 |
| α | 0.00 | β | 0.00 | γ | 0.00 |

Decentration [2]

| | | | | | |
|---|---|---|---|---|---|
| X | 0.00 | Y | -22.05 | Z | 45.00 |
| α | 0.29 | β | 0.00 | γ | 0.00 |

Decentration [3]

| | | | | | |
|---|---|---|---|---|---|
| X | 0.00 | Y | -36.87 | Z | 66.00 |
| α | -3.10 | β | 0.00 | γ | 0.00 |

Decentration [4]

| | | | | | |
|---|---|---|---|---|---|
| X | 0.00 | Y | -45.15 | Z | -20.72 |
| α | 67.37 | β | 0.00 | γ | 0.00 |

Decentration [5]

| | | | | | |
|---|---|---|---|---|---|
| X | 0.00 | Y | -88.89 | Z | -21.96 |
| α | 75.43 | β | 0.00 | γ | 0.00 |

Decentration [6]

| | | | | | |
|---|---|---|---|---|---|
| X | 0.00 | Y | -62.48 | Z | -51.73 |
| α | 142.43 | β | 0.00 | γ | 0.00 |

Decentration [7]

| | | | | | |
|---|---|---|---|---|---|
| X | 0.00 | Y | -75.33 | Z | 4.34 |
| α | 143.19 | β | 0.00 | γ | 0.00 |

Decentration [8]

| | | | | | |
|---|---|---|---|---|---|
| X | 0.00 | Y | -81.46 | Z | 5.61 |
| α | 147.33 | β | 0.00 | γ | 0.00 |

Set out below are the values for Conditions (1) to (4) in Examples 1 and 2.

| | Example 1 | Example 2 |
|---|---|---|
| θ ru[°] | 41.25687 | 27.31844 |
| θ rl [°] | 66.12359 | 54.06171 |
| NAu | 0.376773 | 0.409413 |
| NAl | 0.272823 | 0.230613 |
| Dyu [mm] | 34.43749 | 37.65823 |
| Lm [mm] | 81.53408 | 89.55306 |
| θ ru/θ rl (Condition(1)) | 0.623936 | 0.50532 |
| NAl/NAu (Condition(2)) | 0.724104 | 0.563277 |
| Dyu/Lm (Condition(3)) | 0.422369 | 0.420513 |

If such a binocular image display apparatus as described above is mounted on the viewer, it may be set up in the form an installed type or head mounted type image display apparatus capable of binocular viewing.

Figure 9:
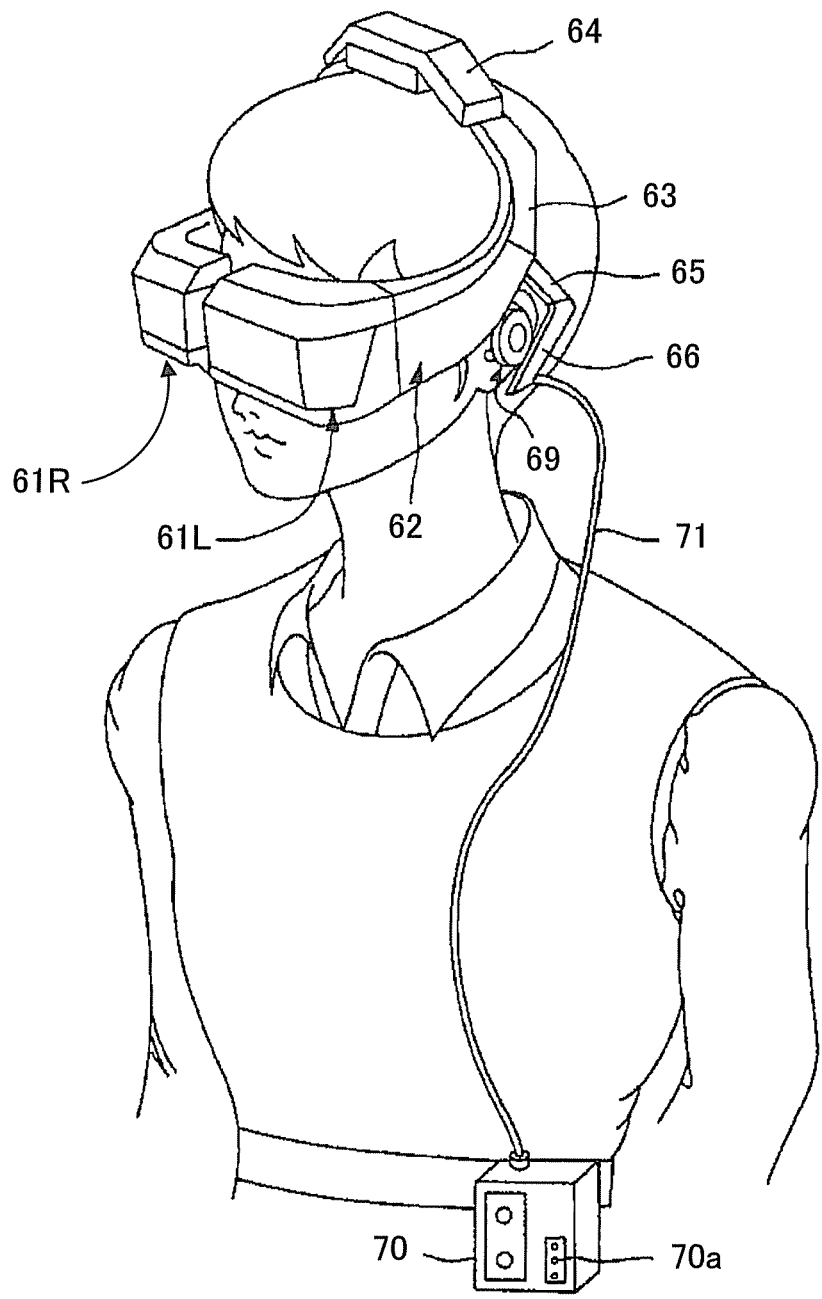
FIG. 9 is illustrative of how the inventive binocular image display apparatus is mounted in place.

FIG. 9 is illustrative of how the binocular image display apparatus is mounted on the viewer. In FIG. 9, 61R and 61L are indicative of a right-eye display apparatus body and a left-eye display apparatus body, respectively, each one housing the aforesaid image display device 5 and viewing optical system inside.

A support member 61 for the right-eye and left-eye display apparatus bodies comprises a front frame 62 and a rear frame 63 joined at its one ends to the display apparatus bodies 61 and extending across the temple regions of the viewer, and a parietal frame 64 joined at both its ends to the other end of the rear frame 63 in such a way as to be sandwiched between them for supporting the parietal region of the viewer's head. The display apparatus bodies 61R and 61L set in front of both eyes are supported by the parietal frame 64 via the front and rear frames 62 and 63, respectively, so that it is fixedly mounted on the viewer's head.

A rear plate 65 formed of a resilient member such as a metal sheet spring is joined near the junction of the front frame 62 to the rear frame 63. More specifically, this rear plate 65 is joined near that junction such that a rear cover 66 forming a part of the aforesaid support member is positioned in the rear of the ears at a region from the occiput to the base of the neck of the viewer and can be supported there. Speakers 69 are attached to the positions corresponding to the ear of the viewer in the rear plate 65 or the rear cover 66.

A cable 71 for transmitting image signals, sound signals or the like from outside coming out of the display apparatus body 61 extends out of the rear end of the rear plate 65 or the rear cover 66 via the interiors of the parietal frame 64, rear frame 63, front frame 62 and rear plate 65. And this cable 71 is connected to a video playback unit 70. Note here that reference numeral 70a is a controller for switches and volume on the video playback unit 70.

It is here to be noted that the leading end of the cable 71 may be jacked for attachment to an existing video deck or the like. It may also be connected to a tuner for reception of TV waves for the purpose of watching TVs. Moreover, it may be connected to a computer for reception of computer graphics images or message images from it. In order to eliminate troublesome cords, it may be connected to an antenna for reception of external signals via waves. If such a binocular image display apparatus is used to display images prepared for the right eye and the left eye, it is then possible to present 3D images to the viewer.

While some embodiments of the invention have been described, it is to be understood that the invention is not limited to them; so other embodiments comprising suitable combinations of arrangements thereof may be included in the invention too.

The invention claimed is:

1. A binocular image display apparatus provided which comprises:
   two image display devices corresponding to the left and right eyeballs of a viewer, respectively, and
   two viewing optical systems, one for the left eye and one for the right eye, for projecting original images on the image display devices onto the left and right eyeballs of the viewer, wherein:
   in the left-eye and right-eye viewing optical systems, an observation image projected onto one eyeball includes a fused image area wherein the observation image overlaps a part of an observation image projected onto another eyeball and a monocular area other than the fused image area, and inside resolution in a horizontal direction with respect to a visual axis of the viewer is set higher than outside resolution, wherein the left-eye and right-eye viewing optical systems each comprise a relay optical system to form an intermediate image for an original image on the associated image display device and an eyepiece optical system to project that intermediate image as a virtual image; and wherein
   the binocular image display apparatus satisfies the following condition (1):

$$0.5 \leq NAl/NAu \leq 0.95 \quad (1)$$

where, given back ray tracing, NAu is an image-side numerical aperture of a light beam inside of the relay system, and NAl is an image-side numerical aperture of a light beam outside of the relay optical system.

2. The binocular image display apparatus according to claim 1, which satisfies the following condition (2):

$$0.25 \leq \theta ru/\theta rl \leq 0.9 \quad (2)$$

where, given back ray tracing, θru is an angle of incidence of an inside chief ray on a first reflecting surface in the relay optical system, and θrl is an angle of incidence of an outside chief ray on the first reflecting surface in the relay optical system.

3. The binocular image display apparatus according to claim 1, which satisfies the following condition (3):

$$0.1 \leq Dyu/Lm < 0.5 \quad (3)$$

where, given a Y-direction defined by a direction that is orthogonal to a visual axis of the viewer and lies horizontal to the viewer, Dyu is a Y-direction distance from a point of intersection of the visual axis of the viewer with an inside, outermost light ray of the eyepiece optical system, and Lm is a Y-direction distance from a point of intersection of an inside, maximum angle of field of the eyepiece optical system with an outside, outermost light ray.

* * * * *